Dec. 25, 1923.　　　　　　　　　　　　　　　　　　1,478,808
J. M. WEBER
RING MESH AND CHAIN MACHINE
Filed Aug. 30, 1921　　　2 Sheets-Sheet 2
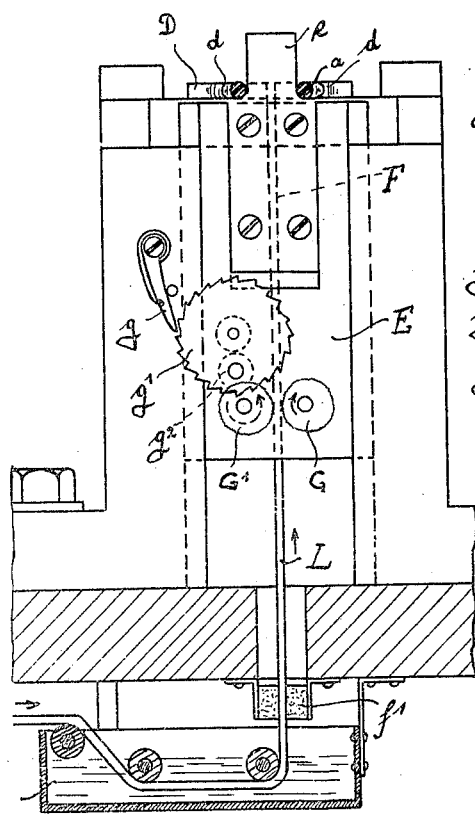
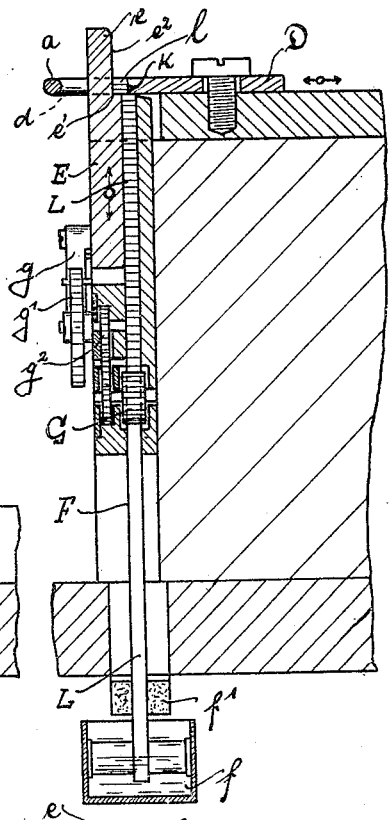
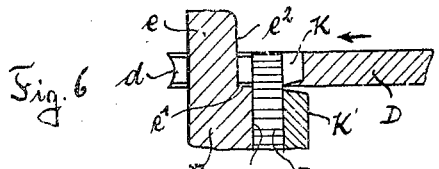
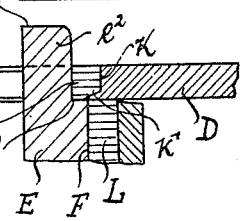
INVENTOR
Johann Martin Weber
BY
Briesen Schrenk
ATTORNEYS Patented Dec. 25, 1923.

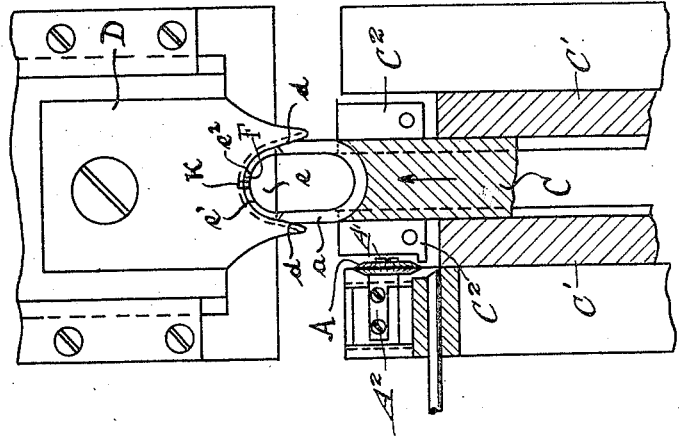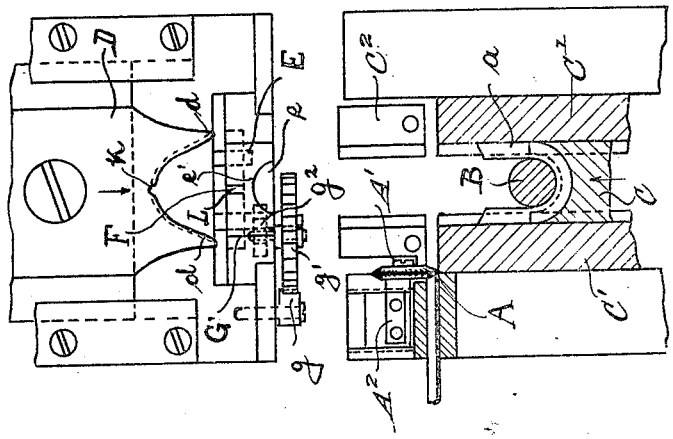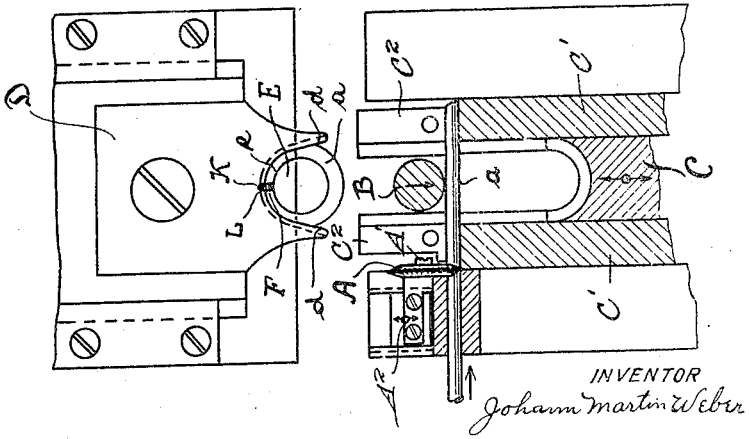

1,478,808

UNITED STATES PATENT OFFICE.

JOHANN MARTIN WEBER, OF FRANKFORT-ON-THE-MAIN, GERMANY, ASSIGNOR TO ERNST GIDEON BEK, OF PFORZHEIM, GERMANY.

RING MESH AND CHAIN MACHINE.

Application filed August 30, 1921. Serial No. 496,926.

(GRANTED UNDER THE PROVISIONS OF THE ACT OF MARCH 3, 1921, 41 STAT. L., 1313.)

*To all whom it may concern:*

Be it known that I, JOHANN MARTIN WEBER, a citizen of the German Republic, and resident of Frankfort-on-the-Main, Germany, have invented certain new and useful Improvements in Ring Mesh and Chain Machines; and I do hereby declare the following to be full, clear, and exact description of the invention, such as will enable others skilled in the art to which it appertains to make and use the same.

Applications for patents for this invention have been filed in Germany June 24, 1916; Austria April 16, 1917; Switzerland April 17, 1917; Netherlands January 15, 1920; Spain February 3, 1920; Czechoslovakia April 17, 1920; Poland June 26, 1920; Sweden January 28, 1920; Denmark January 28, 1920; England January 14, 1921; Norway February 14, 1921; Italy February 2, 1921; Belgium January 7, 1921; France March 11, 1921; Hungary February 18, 1921.

This invention relates to machines for automatically making wire fabric of the type known as ring-mesh but is applicable also to the manufacture of chains. It relates more particularly to the soldering of the rings and to the introduction of a piece of solder into the joint of each link preparatory to the soldering by heating the chain or ring-mesh.

The principal object of the present invention is to cut off a piece of solder from a thread, to transport it to the spot where the joint or seam of a chain-link is to be subsequently formed and to hold the said piece of solder by special means positively at the proper spot until the joint is completed and the faces of the wire pressed against the solder.

Other features of the invention to obtain this object will appear from the following specification and the drawings.

I have shown in the drawings only the operative parts of the machine, which may be mounted on a proper machine frame and moved by proper instrumentalities of any well known type.

Figs. 1, 2 and 3 are three horizontal sections showing the operative parts in subsequent steps of their function, Figs. 4 and 5 are corresponding vertical sections partly in elevation.

Figs. 6 and 7 are enlarged sections of details.

In Fig. 1ª is the wire from which a chain-link is to be formed and to be inserted into the previously formed adjacent link or links of a chain or a ring-mesh respectively.

The wire is passed before the face of a horizontal pusher or front former C guided in cheek pieces $C^1$ in a well known way. The required length of wire is cut off by a cutter A, when the latter is moved from the position shown in Fig. 3 to the position shown in Fig. 1. The circular cutter is fastened to its carrier $A^2$ by a screw $A^1$, so that normally the cutter will not rotate, but by loosening the screw $A^1$ the cutter may be turned as soon as the edge has grown blunt, to adjust the edge by a length equal to the diameter of the wire. The cutting edge being formed by two conical surfaces, the face of the wire cut thereby is conical also. The two opposing faces of the wire forming the joint or seam of a chain link present a cavity well adapted to hold the soldering piece. The wire piece $a$ is formed to U-shape by a bending pin B forcing the wire into grooves of the front former C in a well known manner (Fig. 2.)

Hereupon the front former C is moved into the position shown in Fig. 3 thereby sliding the U-shaped piece through grooves of a bifurcated slide $C^2$ into the position shown in Fig. 3.

The bending pin B is removed and its place taken by a back-forming pin $e$ of semi-circular section, leaving the back part of the U-shaped piece unoccupied and so allowing space occupied by the adjacent links, which have been received in a well known manner during the described motion of the U-shaped piece.

The back forming pin $e$ is the upper part of a vertically movable block E. Figs. 4 and 5 show the pin $e$ in its highest and working position, to which corresponds the forward position (Figs. 1, 3, 4 and 5) of the horizontally movable back former D. $e^1$ is a shoulder between the back forming pin $e$ and the stouter lower part of the block E. This shoulder $e^1$ is shown in Figs. 4 and 5 in the horizontal plane occupied by the U-shaped wire piece and the back former D.

The back former D is provided with a groove $d$ in a well known manner, into which the ends of the U-shaped piece are introduced by pushing forward the front former C, so that the wire ends are forced into the groove $d$ over the back forming pin $e$.

A channel F is provided in the block E forming the guide way for the thread of solder L. This thread is fed through a vessel $f$ containing a soldering fluid into the channel F by two riffled rollers G $G^1$ protruding slightly into the channel and actuated intermittently by the pawl and ratchet $g$ $g^1$ and the gear $g^2$ by the vertical motion of the block E.

Hereby the rollers feed a piece of soldering thread corresponding to the thickness of the chain wire $a$ at every movement of the block E to protrude above the shoulder $e^1$.

The soldering thread may be riffled beforehand or may be riffled by the rollers G $G^1$ to impart a greater friction to the piece of solder enclosed in the seam of the link before its melting.

The protruding end of the soldering thread F is severed by a cutter $K^1$ (Fig 7). This cutter $K^1$ may be integral with the back former D.

The severed piece of solder is received in a slit $k$ crossing the side walls of the groove $d$ at its apex and acting as a holder of the said piece and is carried forward and shoved over the shoulder $e^1$ by the back former D when sliding to its end position.

After this spot has been reached the back former D stops. Hereupon the described motion of the U-shaped wire piece causes the ends of the wire to bend themselves over the pin $e$ and to press the piece of solder between their concave faces cut by the cutter A.

Now what I claim and desire to secure by Letters Patent is the following:

1. In a machine for making connecting and soldering wire-links the combination of means to form a U-shaped piece, a back former, means to feed the end of soldering thread to the place where the seam of the link is to be formed, means to close the link around the said end and to sever such end from the thread.

2. In a machine for making connecting and soldering wire-links the combination of means to sever a piece of solder from a thread, a grooved back former provided with a cross-slit traversing its groove and adapted to receive and hold the severed piece of solder.

3. In a machine for making connecting and soldering wire-links the combination of a reciprocating block provided with a shoulder and a back forming pin at the side of the shoulder, a channel to feed the soldering thread through provided in the said block and opening in the said shoulder, means to sever a protruding piece of solder from the thread and means to feed the severed piece of solder to the place where the seam of the link is to be formed.

4. In a machine of the character described the combination of a vertical back-forming pin means to raise the said pin a grooved back-former adapted to hold a piece of soldering metal at its apex, means to move the said back-former horizontally into its operative position after the raising of the said pin, a front former adapted to form a U-shaped wire piece and means to move the said former horizontally after the back former has reached the said operative position.

5. In a machine for making articles having connected links, in combination, means for severing a blank of a predetermined length from wire, a bending implement adapted to bend said blank to substantially U-shape, a slide adapted to pass one of the ends of said U-shaped blank through a previously formed link, means to feed the tip of a solder strip into the plane through which said U-shaped blank moves and between the ends of said U-shaped blank, a former to close said U-shaped blank into linking relation with the previously formed link and to close the ends of said U-shaped blank upon the said tip of the solder strip, and means to sever the tip of the solder strip from said strip.

6. In a machine for making articles having connected links, in combination, means for bending a wire blank to U-shape, a slide adapted to pass an end of said U-shaped blank through a previously formed link, implements adapted to form said U-shaped blank into a link in linking relation with said previously formed link, said implements comprising a back former and said slide, means for feeding a solder strip so that the tip thereof is positioned in the plane through which said U-shaped blank moves, a slide adapted to carry said tip between the ends of the said U-shaped blank, a knife edge for severing said tip from the strip, and means to operate said link-forming implements to close the said U-shaped blank upon said tip.

7. In a machine for making articles having connected links, in combination, a former to bend a wire blank to U-shape, a slide adapted to project said U-shaped blank so that one of the ends thereof shall pass through a previously formed link and toward link-forming implements, said link-forming implements comprising said slide, a back former and a forming pin, a reciprocating block carrying said forming pin, a solder strip positioned substantially parallel to the plane of movement of said block, a knife edge upon said back former adapted to sever the protruding tip of the solder strip from the strip, a slit in said back former adapted to receive and move said tip between the ends of said U-shaped blank, and means to operate said forming implements to close the U-shaped blank upon said severed tip.

8. In a machine for making articles having connected links, in combination, a former to bend a wire blank to U-shape, a slide adapted to project said U-shaped blank so that one of the ends thereof shall pass through a previously formed link and toward link-forming implements, said link-forming implements comprising said slide, a back former and a forming pin, a reciprocating slide adapted to carry a solder strip, means actuated by said slide to periodically feed the tip of said solder strip into the path of said back former, a knife edge upon said back former adapted to sever the tip of said solder strip therefrom, a guide in the back former adapted to move the severed tip between the ends of the U-shaped blank, and means to operate said forming implements to close said U-shaped blank into a link and upon said severed tip.

9. In a machine for making articles having connected links, in combination, a former to bend a wire blank to U-shape, a slide adapted to project said U-shaped blank so that one of the ends thereof shall pass through a previously formed link and toward link-forming implements, said link-forming implements comprising said slide, a back former and a forming pin, a reciprocating slide adapted to carry a solder strip, means actuated by said slide to periodically feed the tip of said solder strip into the path of said back former, said solder strip feeding means comprising a pawl upon the said solder slide, said pawl being adapted to engage with and actuate a ratchet, said ratchet being connected with co-acting gears and ribbed rollers actuated by said gears and adapted to embrace between them said solder strip, a knife edge upon said back former adapted to sever the tip of said solder strip therefrom, a guide in the back former adapted to move the severed tip between the ends of the U-shaped blank, and means to operate said forming implements to close said U-shaped blank into a link and upon said severed tip.

10. In a machine for making articles having connected links, in combination, means for severing a blank of a predetermined length from wire, a slide adapted to pass one end of said blank through a previously formed link, means to form said blank into link formation, a solder-thread-guide movable toward and from said link forming means and adapted to intermittently feed a solder strip between the ends of successive links, a former for closing said ends upon the solder and a cutter for cutting the solder.

11. In a machine for making articles having connected links, in combination, means to feed wire toward link-forming-mechanism, a cutter for severing a wire blank from said wire, a former to bend the ends of said wire blank toward each other while said wire blank is in engagement with a previously formed link, means to intermittently feed the tip of the solder strip into the path through which the ends of said blank move and between the ends of said blank, means to close said blank into linking relation with the previously formed link and to close the ends of said blank upon the tip of the solder strip, and means to sever the tip of the solder strip from said strip.

Frankfort-on-the-Main, this 8th day of August, 1921.

In testimony whereof I affix my signature.

JOHANN MARTIN WEBER.